(No Model.)

H. J. CHAMBERS.
ROAD GRADER.

No. 413,846. Patented Oct. 29, 1889.

WITNESSES:
Francis McArdle
C. Sedgwick

INVENTOR:
H. J. Chambers
BY
Munn & Co.
ATTORNEYS.

UNITED STATES PATENT OFFICE.

HENRY J. CHAMBERS, OF BEATRICE, NEBRASKA, ASSIGNOR TO WILLIAM H. DUFFETT, OF SAME PLACE.

ROAD-GRADER.

SPECIFICATION forming part of Letters Patent No. 413,846, dated October 29, 1889.

Application filed July 31, 1889. Serial No. 319,292. (No model.)

*To all whom it may concern:*

Be it known that I, HENRY J. CHAMBERS, of Beatrice, in the county of Gage and State of Nebraska, have invented a new and Improved Road-Grader, of which the following is a full, clear, and exact description.

This invention relates to road-graders, the object of the invention being to prepare a road-bed for the reception of a brick or other pavement; and to the end named the invention consists of a board or frame provided with a shoe, the edge of which shoe is cut to the desired contour of one-half of the road-bed, the ends of the board being supported by trucks, to which they are adjustably connected, all as will be hereinafter fully explained, and specifically pointed out in the claims.

Reference is to be had to the accompanying drawings, forming a part of this specification, in which similar figures and letters of reference indicate corresponding parts in all the views.

Figure 1:
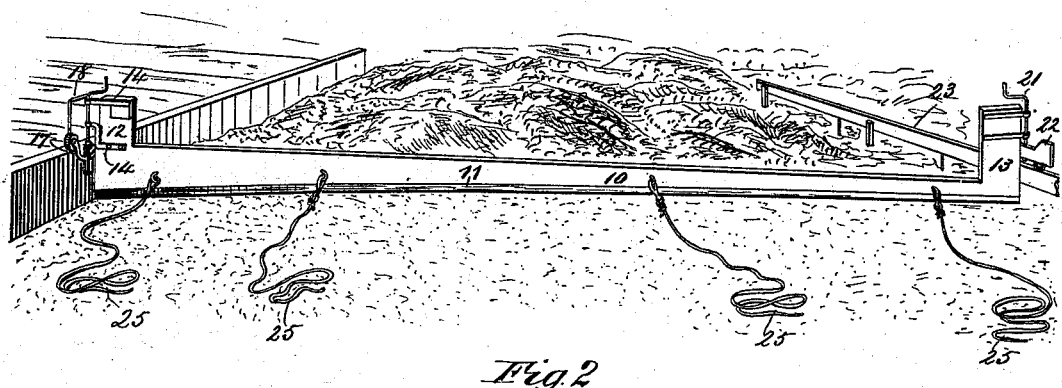
Figure 2:
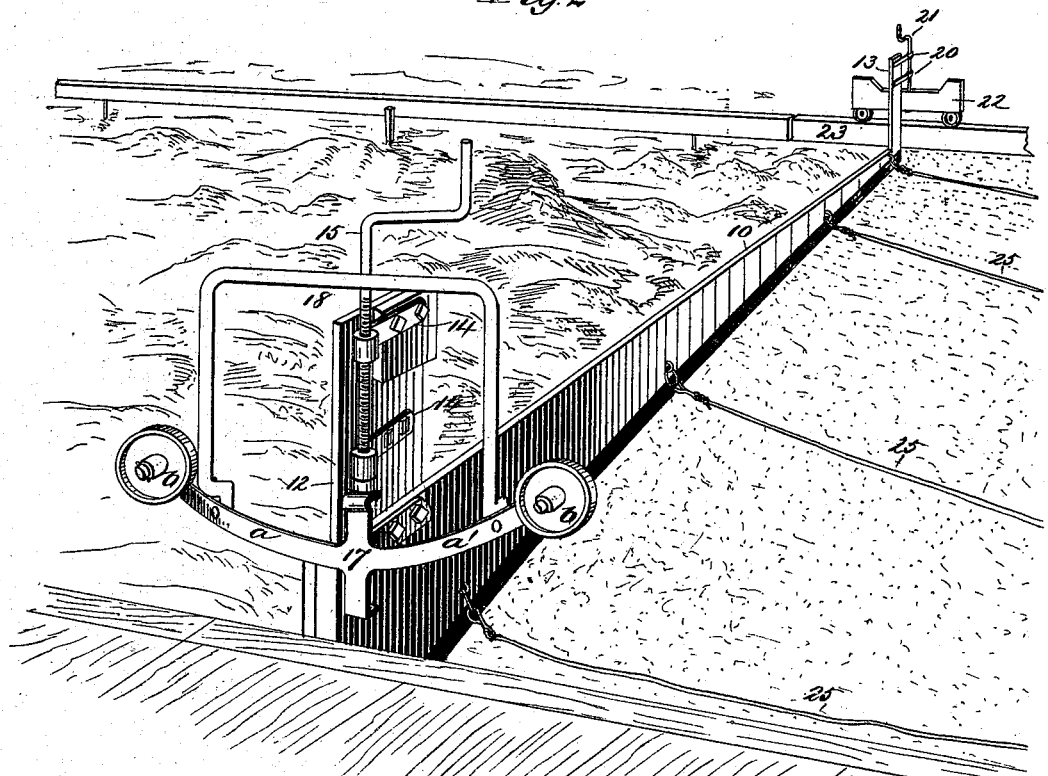
Figure 3:
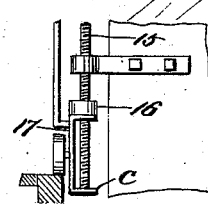

Figure 1 is a perspective view of my improved road-grader, representing the same as it appears when in use. Fig. 2 is a second perspective view taken from a different point of view, the curved truck in this case being raised; and Fig. 3 is a detail view of a portion of the main board and its curved truck.

In the drawings, 10 represents a board, to the lower edge of which there is secured a metallic shoe 11, which is shaped to conform to the contour which it is desired to impart to the road-bed. To the ends of the board 10 there are connected upwardly-extending posts or standards 12 and 13. The standard 12 is provided with brackets 14, through which there is passed a cranked adjusting-screw 15, the lower end of said screw riding in a nut 16, that is carried by a truck 17. The truck 17 is made up of two laterally-extending arms $a\ a'$, upon which the wheels or rollers $b$ are mounted; and in order that the truck may be guided as desired I connect to the arms $a\ a'$ an upwardly-extending frame 18. After passing through the nut 16 the cranked adjusting-screw 15 passes through an inwardly-extending projection $c$, that is carried by the truck 17, such projection serving as a guide and support for the screw. The board or standard 13 carries brackets 20, in which there is mounted a cranked adjusting-screw 21, said screw engaging a nut carried by one of the brackets and a nut carried by a truck 22, which truck runs upon rails 23, that are placed upon proper supports and carried in a line parallel with the curb, being located at the center of the road-bed. A number of draft-ropes 25 are secured to the board 10.

In operation the parts are adjusted as represented in Fig. 1. A man is stationed at each truck in order to guide such trucks, other men grasping the draft-ropes 25 and drawing the apparatus forward, and as the apparatus is so drawn forward the desired contour will be quickly and accurately imparted to the road-bed.

Having thus described my invention, I claim as new and desire to secure by Letters Patent—

1. The combination, with a board 10, of trucks secured to the ends thereof, and central rails 23, one of the trucks being arranged to ride upon said rails and the other truck being arranged to ride upon the curb, substantially as described.

2. The combination, with a board 10, having a shoe 11, and provided with draft-ropes 25, of trucks, center guide-rails, upon which one of the trucks is arranged to run, the other truck being arranged to ride upon the curb, and an adjustable connection, substantially as described, between the board and the trucks.

HENRY J. CHAMBERS.

Witnesses:
W. D. CULVER,
A. G. THOMSON.